(No Model.)
P. D. WAGNER.
TRACK.
No. 322,660. Patented July 21, 1885.
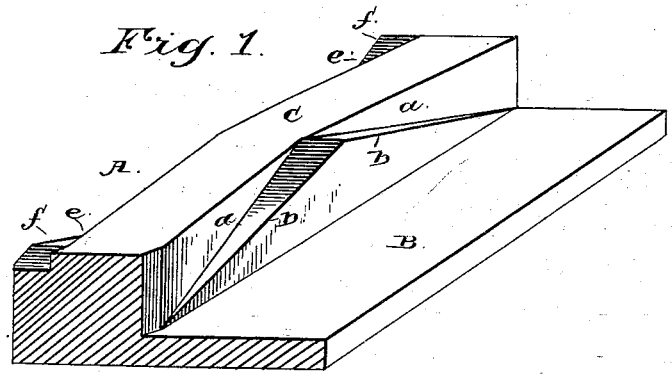
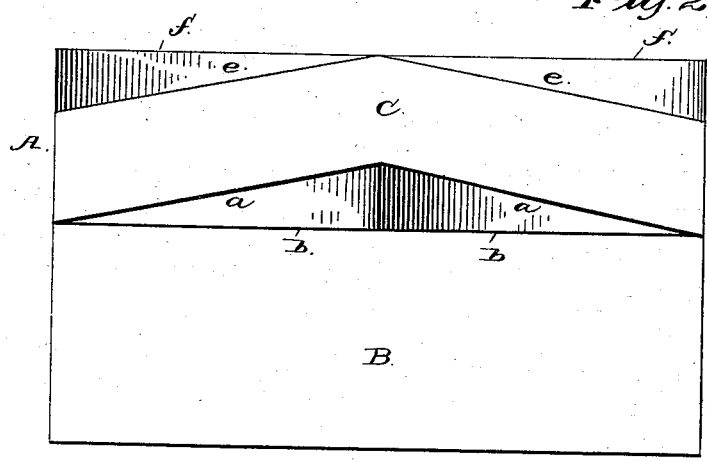
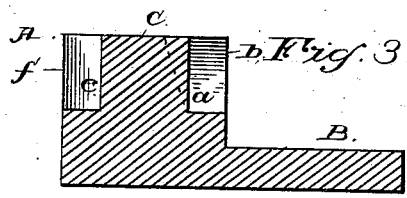
WITNESSES
M. E. Fowler
E. G. Siggers
INVENTOR
P. D. Wagner
By his Attorneys
C. A. Snow & Co.

UNITED STATES PATENT OFFICE.

PHILIP D. WAGNER, OF DAYTON, OHIO.

TRACK.

SPECIFICATION forming part of Letters Patent No. 322,660, dated July 21, 1885.

Application filed March 14, 1885. (No model.)

*To all whom it may concern:*

Be it known that I, PHILIP D. WAGNER, a citizen of the United States, residing at Dayton, in the county of Montgomery and State of Ohio, have invented a new and useful Improvement in Tracks, of which the following is a specification, reference being had to the accompanying drawings.

My invention relates to rails designed for use more particularly upon what are known as "street-railroads;" and it has for its object to so construct the same that a vehicle traveling thereon may readily leave the same without injury to any of its parts, and to obviate the wrenching and slipping of the wheels upon the track when this act is attempted, as is the case with the rails now in ordinary use.

A further object of the invention is to provide a rail for the purposes mentioned which shall be simple in its construction, strong and durable, and thoroughly efficient for the purposes intended.

With these ends in view the invention consists in the improved construction and combination of parts hereinafter fully described, and pointed out in the claims.

In the drawings, Figure 1 is a perspective view of a portion of a railroad-rail constructed in accordance with my invention. Fig. 2 is a plan view of the same, and Fig. 3 is a cross-section.

In the accompanying drawings, in which like letters of reference indicate corresponding parts in all the figures, A represents the rail, which is, as usual, provided with an inwardly-extending wing or flange, B, projecting from its lower end, and upon which the flange of the car-wheel is adapted to travel. The body or tread C of the rail is cut off on its inner sides at suitable intervals, as shown at *a*, the said cut-out portions extending up to the top of the rail, so as to form a tread for the wheel of a vehicle when attempting to leave the track, and when traveling in either direction, the said cut-out portions forming ledges *b*, inclining upwardly from opposite points, and meeting at a point on a horizontal plane with the face of the track. The outer side of the track is provided at suitable intervals with cut-out portions *e*, forming ledges *f*, which incline downwardly from opposite points, said points being on a horizontal plane with the upper or bearing face of the track, and meeting at a point on a horizontal plane with the lower end of the said track, the ledges *f* in this case enabling a vehicle to be readily and easily driven upon the rails without danger of wrenching the wheels.

In operation the wheels of the vehicle travel upon the wings or flanges B of the track, and when it is desired to leave the tracks the vehicle is slightly turned at an angle when one of the ledges are reached, and travels up upon the same, while in driving on the tracks the wheels strike upon the ledges *f*, which allow the wheels to readily travel up on the same, while in the old form of rail the wheels would strike the side of the track at an angle and slide thereon a considerable distance, and thus loosen the spokes or bend the fellies, or in some other way injure the running-gear of a vehicle, while by the use of my improvements these objections are all overcome.

Having fully described my invention, what I claim as new, and desire to secure by Letters Patent, is—

1. A rail having its tread cut out on its side, which cut-out portion increases in size from the bottom to the top, so as to form ledges having their upper portions greater in width than their lower portions, for the purpose set forth.

2. A rail having inclined plane ledges formed with the tread and extending in the same line of direction, said ledges meeting the tread at their upper ends on a horizontal line therewith, as set forth.

3. A rail having its tread provided with inclined ledges, which increase in width from the bottom to the top of the tread, as set forth.

4. A rail having its tread provided at intervals with a pair of inclined plane ledges, which extend alongside of the tread from the bottom to the top, said ledges meeting each other at their upper ends on the same horizontal plane with the tread, as set forth.

5. A rail having its tread provided with projecting ledges, which extend in an inclined straight line alongside of the tread, as set forth.

6. A rail having its tread provided with projecting ledges, which extend alongside of the tread on the inner and outer faces or sides thereof, and are inclined upwardly in straight lines, as shown, for the purpose set forth.

7. A rail having its tread provided with inclined plane ledges on the inner and outer sides or faces of the tread, said ledges increasing in width from the bottom to the top, as set forth.

8. A rail having its tread provided with ledges, which run alongside of the tread, and are inclined upward in straight lines in opposite directions, for the purpose set forth.

In testimony that I claim the foregoing as my own I have hereto affixed my signature in presence of two witnesses.

PHILIP D. WAGNER.

Witnesses:
F. T. HUFFMAN,
CHARLES W. DALE.